Figure 1:
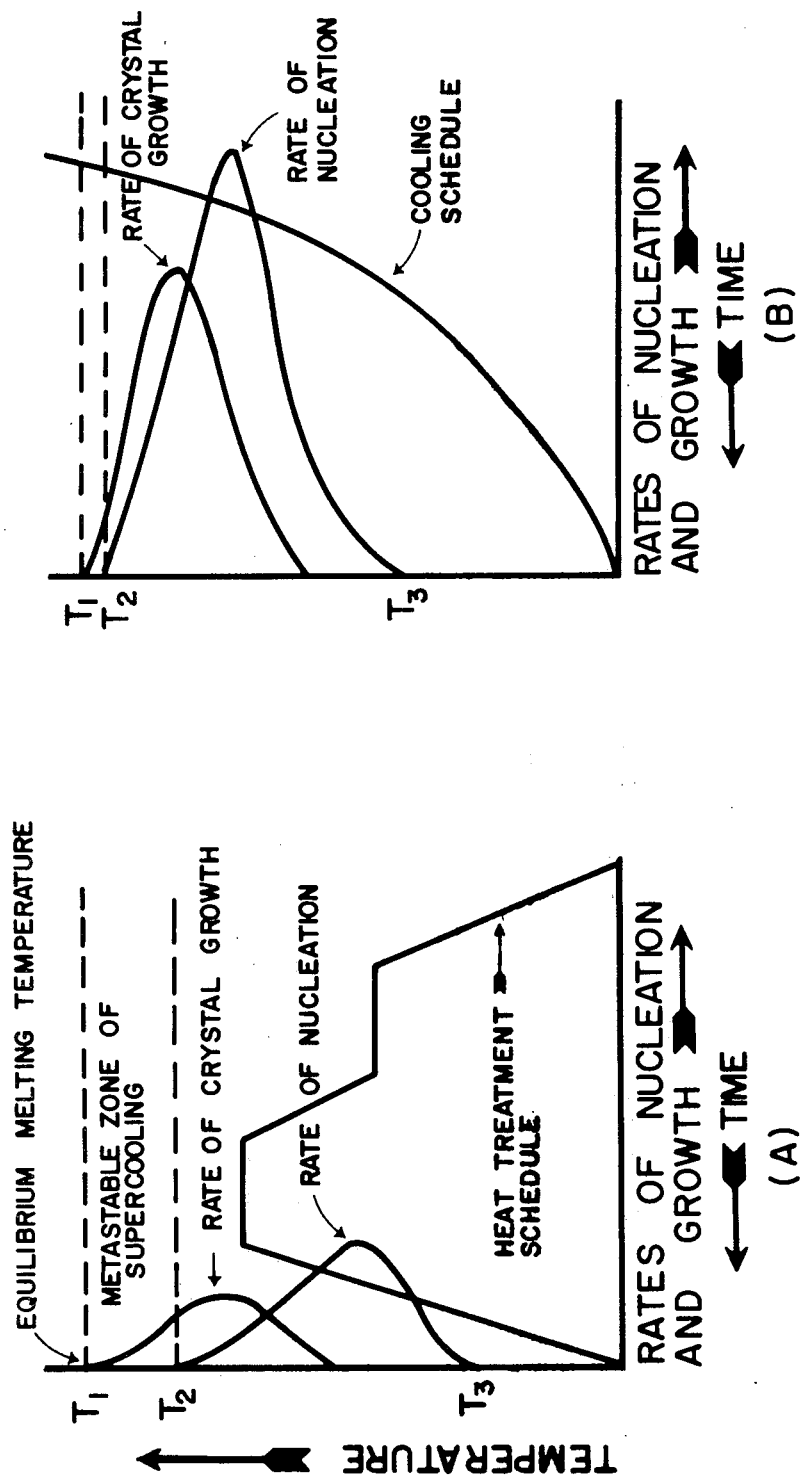

United States Patent [19]

Beall

[11] 4,239,521
[45] Dec. 16, 1980

[54] SPONTANEOUSLY-FORMED ALPHA-QUARTZ GLASS-CERAMICS

[75] Inventor: George H. Beall, Big Flats, N.Y.
[73] Assignee: Corning Glass Works, Corning, N.Y.
[21] Appl. No.: 559,786
[22] Filed: Mar. 19, 1975
[51] Int. Cl.³ .................... C03B 27/00; C03B 32/00; C03C 3/22
[52] U.S. Cl. ................................. 65/33; 65/114
[58] Field of Search ........................ 65/33; 65/114

[56] References Cited

U.S. PATENT DOCUMENTS

| | | | |
|---|---|---|---|
| 3,690,855 | 9/1972 | Schultz | 65/33 |
| 3,741,861 | 6/1973 | Andriev | 65/33 |
| 3,804,608 | 4/1974 | Gaskell et al. | 65/33 |
| 3,809,543 | 5/1974 | Gaskell et al. | 65/33 |
| 3,846,101 | 11/1974 | Gaskell et al. | 65/33 |
| 3,985,531 | 10/1976 | Grossman | 65/33 |

Primary Examiner—Richard V. Fisher
Attorney, Agent, or Firm—Clinton S. Janes, Jr.; Clarence R. Patty, Jr.

[57] ABSTRACT

The instant invention to the manufacture of articles exhibiting the highly-crystalline, uniformly fine-grained microstructure of conventional glass-ceramic bodies, but which can be formed spontaneously through cooling a molten glass-forming batch. Hence, the articles of the present invention are not produced by heat treating glass bodies at elevated temperatures to cause crystallization in situ as is required in the manufacture of the classic glass-ceramic articles. Instead, this invention provides a method for spontaneously-forming glass-ceramic articles having compositions within a narrowly-defined area of the $Li_2O\text{-}Al_2O_3\text{-}B_2O_3\text{-}SiO_2\text{-}TiO_2$ field wherein alpha-quartz solid solution constitutes the predominant crystal phase.

3 Claims, 2 Drawing Figures

RATES OF NUCLEATION AND GROWTH WITHIN (A) CONVENTIONAL AND (B) SPONTANEOUSLY FORMED GLASS-CERAMIC SYSTEMS

SPONTANEOUSLY-FORMED ALPHA-QUARTZ GLASS-CERAMICS

United States applications Ser. Nos. 559,725 (now U.S. Pat. No. 3,985,531) and 559,787, filed concurrently herewith by D. G. Grossman, and United States Application No. 559,732 (now U.S. Pat. No. 3,985,534) filed concurrently herewith by J. E. Flannery and D. R. Wexell, describe the manufacture of spontaneously-formed glass-ceramic articles wherein a fluormica comprises the predominant crystal phase. United States Applications Serial Nos. 559,727 (now U.S. Pat. No. 3,985,533), 559,789, and 559,726 (now U.S. Pat. No. 3,985,532) also filed concurrently herewith by D. G. Grossman, describe the production of spontaneously-formed glass-ceramic articles wherein beta-spodumene solid solution, mullite, and celsian, respectively, constitutes the primary crystal phase. United States Applications Ser. Nos. 559,731 (now U.S. Pat. No. 3,989,496) and 559,730 (now U.S. Pat. No. 4,000,998) filed concurrently herewith by H. L. Rittler, describe the formation of spontaneously-formed glass-ceramic articles wherein $BaO$ and/or $SrO-Fe_2O_3-SiO_2$ solid solution and carnegieite and/or nepheline solid solution, respectively, comprises the predominant crystal phase. Finally, United States Application Ser. No. 559,788, filed concurrently herewith by G. H. Beall, P. E. Blaszyk, and W. T. Brydges, III, describes the production of spontaneously-formed glass-ceramic articles wherein beta-spodumene solid solution constitutes the principal crystal phase.

The field of glass-ceramics is grounded in U.S. Pat. No. 2,920,971. As is explained in that patent, the manufacture of the classic glass-ceramic article contemplates the controlled heat treatment of a parent or precursor glass body at elevated temperatures. Thus, three steps comprise the method for making conventional glass-ceramic articles. First, a glass-forming batch, commonly containing a nucleating agent, is melted. Second, this melt is cooled to at least within and, more commonly, below the transformation range to yield an essentially crystal-free glass and, at the same time, a body of a desired configuration shaped therefrom. Third, this glass body is heated to a temperature above the transformation range thereof to cause the growth of crystals in situ. [The transformation range has been defined as that temperature at which a molten mass is converted into an amorphous solid, and has usually been considered as lying in the vicinity of the annealing point of a glass.]

In normal practice, the third or crystallization step is divided into two parts. In the first part the precursor glass body is heated to a temperature slightly above the transformation range and is held thereat for a sufficient length of time to obtain substantial nucleation. Subsequently, the nucleated body is heated to a still higher temperature, customarily above the softening point of the parent glass, and maintained at that temperature for a period of time sufficient to cause the growth of crystals on the nuclei.

This careful heat treatment of the glass body results in the formation of a homogeneously-crystallized article wherein the crystals are relatively uniformly fine-grained. However, for a more detailed discussion of the microstructure and production of the classic glass-ceramic body, reference is again made to U.S. Pat. No. 2,920,971, supra.

In the general manufacture of glass articles, it has frequently been observed that crystallization will occur therein during the cooling and forming of the molten batch. This crystallization begins at the surface of the melt or at the interface between the molten batch and a forming element, and then grows inwardly into the glass body. The phenomenon has been termed "normal devitrification" and is commonly regarded as undesirable because the final microstructure is composed of nonuniformly sized, relatively coarse-grained crystals which are usually oriented in a plane perpendicular to the surface. This type of microstructure commonly leads to a mechanically-weak article.

The mechanism of "normal devitrification" differs fundamentally from that present in the production of glass-ceramic articles because it is founded upon crystallization occurring at temperatures approaching or coincident with the liquidus of the molten batch. Another example of crystallization taking place at or near the liquidus temperature exists in the fusion casting of refractory ceramic materials. In contrast to those processes, the formation of glass-ceramic articles via the controlled heat treatment of precursor glass bodies involves temperatures substantially below the liquidus, thereby providing a larger degree of super-cooling such that the growth of crystals takes place in the glass at a much higher viscosity level and, in so doing, permits time to play an important role in crystal growth.

The instant invention relates to spontaneously-formed glass-ceramic articles, i.e., articles exhibiting microstructures and physical characteristics similar to those of classic glass-ceramic articles, but which can be produced by means of a straightforward cooling of a molten glass-forming batch with no subsequent heat treatment of a glass body being required. Hence, certain compositions within a narrowly-defined ambit of the $Li_2O-Al_2O_3-B_2O_3-SiO_2$ system nucleated with $TiO_2$, when cooled from a melt, can form bodies consisting essentially of uniformly fine-grained crystals homogeneously dispersed within a glassy matrix. The resulting articles, with no subsequent heat treatment, are highly crystalline, i.e., greater than 50% by volume crystalline, and the crystals, themselves, are less than about 5 microns in diameter with the majority being less than one micron.

FIG. 1 graphically explains the differences in crystallization mechanism existing between the spontaneously-formed glass-ceramic bodies of the instant invention and conventional glass-ceramic articles. The most critical key to comprehending those differences is believed to lie in the overlap observed in the rate curves for nucleation and crystallization set out therein. Thus, below the equilibrium melting temperature of the viscous liquid $T_1$, there is a range of temperatures ($T_1-T_2$) wherein nuclei do not develop at a perceptible rate. This temperature interval has been termed the metastable zone of supercooling. In the conventional glass-ceramic compositions no crystals form at or immediately below this metastable zone, since the rate of nucleation is so very slow that growth sites for crystals are not provided. Hence, in the classic glass-ceramic systems, nucleation occurs within the $T_2-T_3$ range of temperatures.

The crystallization mechanism comprising the basis for the production of conventional glass-ceramic articles is pictorially delineated in FIG. 1(A). As is shown therein, crystallization is secured by reheating the supercooled liquid, i.e., the precursor glass body, in two steps. First, the body is heated into the temperature interval of maximum nucleation and held thereat for a period of time sufficient to achieve the substantial development of nuclei. Second, the temperature of the nucleated body is raised into the region of maximum crystal growth and held therewithin for an adequate length of time to obtain the desired high crystallinity.

The crystallization mechanism prevailing in the manufacture of the spontaneously-formed glass-ceramic articles of the instant invention is represented in FIG. 1(B). As can be observed, the metastable zone of supercooling is substantially narrower and the rates of nucleation and crystallization much greater. In view of those factors, nucleation and crystal growth can occur at such a rapid rate immediately below the temperature interval of metastable supercooling that dwell periods of any consequence within those respective zones are not required. Such conditions result in the simple cooling of the melt providing a body having uniformly fine-grained crystals dispersed within a glassy matrix. it will, however, be immediately apparent that too rapid quenching of the melt could cool the mass through the respective zones of nucleation and crystallization at such a rate that there would be insufficient time to produce the desired fine-grained glass-ceramic article.

U.S. Pat. No. 3,804,608 describes a number of compositions which can be formed into glass-ceramic bodies without employing the reheating step required in the production of conventional glass-ceramic bodies. Whereas compositions containing $Li_2O$, $Al_2O_3$, $B_2O_3$, $SiO_2$, and $TiO_2$ are disclosed therein, the proportions of the ingredients are outside of those found operable in the instant invention and the crystal phases obtained were unlike that constituting the predominant phase in the present products. Consequently, the physical properties of those articles are different from the properties exhibited by the articles of the instant invention.

Spontaneously-formed glass-ceramic articles exhibiting coefficients of thermal expansion ranging between about $35-100 \times 10^{-7}/°$ C. over the temperature range of 0° to 600° C., and wherein alpha-quartz solid solution comprises the predominant crystal phase, can be produced from compositions consisting essentially, expressed in weight percent on the oxide basis, of about 2.5–6% $Li_2O$, 5–11% $Al_2O_3$, 1.5–7.5% $B_2O_3$, 60–75% $SiO_2$, and 6–13% $TiO_2$ as the nucleating agent.

Alpha-quartz solid solution, based upon $B^{+3}$ and $Al^{+3}$ substitutions for $Si^{+4}$ in the tetrahedral crystalline network accompanied by $Li^+$ stuffing of interstitial vacancies, is the major crystal phase and generally has a high coefficient of thermal expansion. Minor amounts of rutile ($TiO_2$), gahnite ($ZnO.Al_2O_3$), and beta-spodumene solid solution may also be present. The latter phase was a low coefficient of thermal expansion such that, by careful control of the respective amounts of the alpha-quartz and beta-spodumene phases, the expansion coefficient can be tailored to a specific value.

Beta-spodumene, the high temperature form of alpha-spodumene, has the classic formula $Li_2O.Al_2O_3.4SiO_2$. Hence, the expression "beta-spodumene" has been used to designate a crystal in the trapezohedral class of the tetragonal system having the formula $Li_2O.Al_2O_3.4SiO_2$, and which is formed by heating alpha-spodumene to a conversion temperature in the neighborhood of 700° C. However, in $Li_2O-Al_2O_3-SiO_2$ glass-ceramic materials, the crystal phase does not conform strictly to the classic spodumene composition. Rather, it is more in the nature of a solid solution corresponding generally to the formula $Li_2O.Al_2O_3.nSiO_2$, where "n" may vary from about 3.5 to 10. There is also evidence that ions such as $Mg^{+2}$ and $Zn^{+2}$ can appear as well in the crystal if present in the initial glass composition. Nevertheless, an X-ray diffraction pattern invariably indicates a crystal in the trapezohedral class of the tetragonal system. Therefore, it has become customary in identifying the crystal phases in glass-ceramic articles to term such crystals as beta-spodumene solid solution and that practice is adhered to here.

Not only can $B_2O_3$ enter into the structure of the alpha-quartz, but its inclusion in amounts of at least 1.5% is demanded to stabilize the residual glass and insure uniformity of grain size. $Na_2O$ and/or $K_2O$ in amounts up to a total of about 4% can also be helpful in stabilizing the residual glass and inhibiting uncontrolled grain growth. Other compatible metal oxides can be included in minor amounts without deleteriously affecting the basic character of the final product. Hence, for example, $ZnO$ can be added in amounts up to about 10% and $P_2O_5$ in quantities up to about 5%. $Zn^{+2}$ ions may be found in the crystal phase while the $P_2O_5$ appears to become part of the glassy matrix. $ZrO_2$ can act as a secondary nucleant in amounts up to about 3%. $MgO$, $CaO$, $SrO$, and $BaO$ can be tolerated up to about 3% but their presence can lead to unwanted crystal phases appearing. $As_2O_5$ and $Sb_2O_5$ may be present in their conventional function as a fining agent. $As_2O_5$ has the further faculty of maintaining the $TiO_2$ in the oxidized state, thereby insuring a white appearance in the crystallized body. In general, however, the total of all additions to the base $Li_2O-Al_2O_3-B_2O_3-SiO_2-TiO_2$ composition will preferably be held below about 10%.

Titania is essential to achieve spontaneous fine-grained glass-ceramic articles in this composition system. Its presence provides spontaneous opalization which, as will be pointed out hereinafter, is a critical event required to precede uniform crystallization. Titanate crystallites are also required for internal silicate nucleation.

The fundamental difference existing between the process of the instant invention and the method for making conventional glass-ceramic articles is that the former involves a uniform or interrupted cooling schedule, but no reheating step. FIG. 1 indicates that the temperature at which crystallization takes place is a vital factor. From a practical point of view, the viscosity of the glass melt must be great enough to permit forming processes to be conducted prior to the onset of crystallization. Thus, the forming must be carried out at temperatures no lower than that where crystallization begins. The crystallization temperature is below the liquidus of the glass and is believed to be directly related to the aforementioned opalization phenomenon. Both the opalization and the subsequent crystallization are metastable time-temperature dependent phenomena.

Table I lists a number of glass-forming compositions, expressed in weight percent on the oxide basis, operable in the instant invention. The actual batch ingredients can comprise any materials, either the oxide or other compound, which, when melted together, will be converted to the desired oxide in the proper proportion. The batch ingredients were ballmilled together to assist in securing a homogeneous melt and then run into a platinum crucible. A cover was placed on the crucible and the crucible introduced into an electrically-fired furnace operating at about 1600° C. After about 16 hours, the melt was poured into a graphite or steel mold to form a slab about $6'' \times 6'' \times \frac{1}{2}''$. The slab was permitted to cool in the ambient atmosphere to about 900° C., as measured with an optical pyrometer, this cooling usually being completed in about 60 seconds, and then transferred to an annealer operating at about 750°–850° C., depending upon the compositions of the batch.

As the initial rapid cooling proceeds, the melt appears to stiffen normally until a temperature of about 900°–1050° C., as read on an optical pyrometer, is reached. At or somewhat below that temperature, a hazy opalization is observed at the edges of the slab which moves toward the center thereof. This phenomenon is quickly followed by a wave of opaque crystallization. The exothermic heat of crystallization can cause local increases in temperature but the cooling resumes and an opaque, fine-grained glass-ceramic body results. Some slight warping or other effects of rapid devitrification occurring during the rapid crystallization may be encountered but the inclusion of $B_2O_3$ and, optionally, $Na_2O$ and/or $K_2O$ can alleviate such problems. The only other visible effect is the thermochromic behavior of rutile, where present, which causes the glass-ceramic to change from a yellow-green to white during the final cooling to room temperature.

It has been determined that this prior opalization is vital to achieve the desired glass-ceramic articles. Thus, to assure fine-grained crystallization during the cooling of the melt, there must be a very high degree of nucleation at temperatures at or above the optimum growth temperature. This required nucleation at about 100°–300° C. above the annealing point of the precursor glass is provided by the opalization phenomenon which is dependent upon the glass composition. Hence, spontaneous crystallization can occur in many glasses but unless one of the amorphous phases involved in the opalization is at least partially unstable as a glass and crystalline nuclei of some type are precipitated, there will be no spontaneous fine-grained crystallization of the major glass components. In the present compositions, it is believed that titania is concentrated in one of the amorphous opal phases, since, in the absence thereof, neither opalization nor spontaneous crystallization is observed. Moreover, the tendency for titanium to increase its coordination from 4 to 6 during the cooling of aluminosilicate glasses, resulting in fine phase separation, is well-recognized. This factor lends further credence to the hypothesis regarding the action of titania in the instant glasses.

The rapid and spontaneous growth of alpha-quartz crystals upon the titanate nuclei is not completely understood. Nevertheless, it is postulated that crystallites are developed at temperatures well above the annealing point of the glass, during or immediately after the opalization occurs, which provide available nuclei while the glass is still within the temperature interval for maximum crystal growth.

FIG. 1(B) can be of help in explaining this phenomenon. hence, as is illustrated therein, there must be a very high degree of nucleation at temperatures near or at the optimum growth temperature to secure the desired crystallization as the molten batch cools. Therefore, the opalization occurring at about 100°–300° C. above the annealing point of the glass provides the necessary nucleation.

The rate of crystallization is a function of glass composition. In general, the most rapidly crystallizing compositions, i.e., those having the capability of crystallizing within a few seconds, contain high concentrations of lithia and titania, whereas the slowest crystallizing compositions contain high proportions of silica. Therefore, those compositions incorporating high $Li_2O$ and $TiO_2$ contents require essentially no annealing step, as such, to yield fine-grained glass-ceramics, while the high $SiO_2$ bodies will normally be subjected to a short annealing schedule. However, these latter require no reheating step.

Melt cooling rates between about 10°–1000° C./minute to the temperature at which the phase separation and concomitant opalization occurs, viz., about 900°–1050° C., depending upon the glass composition, have been found satisfactory. Subsequently, the body is exposed to a temperature between the annealing point of the glass and the temperature at which phase separation and nucleation occur for a sufficient length of time to cause the development of a highly-crystalline body consisting essentially of fine-grained alpha-quartz solid solution crystals. This exposure may be no more than about one-half minute within the temperature interval of about 650°–900° C.

Thus, annealing times ranging from less than a minute to about a half hour were generally found adequate to yield the desired glass-ceramic articles. Annealing temperatures higher than about 850° C. can result in unwanted deformation and slumping of the articles. Much longer annealing schedules can be employed but, from a commercial point of view, are not looked upon favorably since such merely add to the cost of production.

Whereas the preferred practice of the invention contemplates crystallizing the article as the phase separated and nucleated glass body is cooled to room temperature, it will be recognized that the melt can be cooled at such a rapid rate that the necessary phase separation and nucleation take place, but crystals do not have time to grow on the nuclei so the cooled article is substantially glassy. Nevertheless, fine-grained crystallization of that glassy body can be attained by exposing it to a temperature within the crystallization range in like manner to that described above with respect to the crystallization grown as the melt is simply cooled to room temperature. Hence, this is a further indication that it is the occurrence of phase separation and nucleation at temperatures above the crystallization range which is of critical importance to the successful operation of the invention.

In Table I, $As_2O_5$ is reported as being present in excess of the base composition.

TABLE I

|  | 1 | 2 | 3 | 4 | 5 | 6 | 7 | 8 | 9 | 10 |
|---|---|---|---|---|---|---|---|---|---|---|
| $SiO_2$ | 71.5 | 71.0 | 69.0 | 71.0 | 70.0 | 72.0 | 72.0 | 72.0 | 71.0 | 62.0 |
| $B_2O_3$ | 3.0 | 3.0 | 4.0 | 4.5 | 4.5 | 5.0 | 2.0 | 3.0 | 3.0 | 6.0 |
| $Al_2O_3$ | 10.5 | 9.0 | 9.0 | 7.5 | 7.5 | 6.0 | 9.0 | 9.0 | 9.0 | 9.0 |
| $Li_2O$ | 3.0 | 5.0 | 3.0 | 3.0 | 3.0 | 3.0 | 4.0 | 5.0 | 5.0 | 5.0 |
| ZnO | 2.0 | 2.0 | 6.0 | 2.0 | 2.0 | 2.0 | 2.0 | — | 3.0 | 2.0 |
| $Na_2O$ | 2.0 | 1.0 | 1.0 | 1.0 | 1.0 | 1.0 | 1.0 | 2.0 | — | 1.0 |
| $TiO_2$ | 8.0 | 9.0 | 8.0 | 8.0 | 6.5 | 8.0 | 8.0 | 9.0 | 9.0 | 11.0 |
| $P_2O_5$ | — | — | — | 2.0 | 3.0 | 3.0 | 2.0 | — | — | 3.0 |

TABLE I-continued

|        | 1   | 2   | 3   | 4   | 5   | 6   | 7   | 8   | 9   | 10  |
|--------|-----|-----|-----|-----|-----|-----|-----|-----|-----|-----|
| $As_2O_5$ | 1.0 | 1.0 | 1.0 | 1.0 | 1.0 | 1.0 | 1.0 | 1.0 | 1.0 | 1.0 |

Table II provides a summary of the cooling conditions applied to the Examples of Table I to secure spontaneous glass-ceramic articles along with a description of the physical appearance, the internal microstructure, the crystal phases identified by X-ray diffraction analysis, and the coefficient of thermal expansion ($\times 10^{-7}/°C$.) as measured over the range of 0° to 600°. The latter values were determined in accordance with standard measuring techniques on bar samples.

Whereas alpha-quartz solid solution (s.s.) is by far the predominant crystal phase present, rutile, gahnite and beta-spodumene solid solution (s.s.) have been observed in minor amounts. The amount of rutile and/or gahnite present is normally less than about 5% by volume of the product. This low level of rutile is somewhat anomalous since the titania content in the parent glass is frequently greater than 8%. However, it is believed that $Ti^{+4}$ ions are entrapped within the alpha-quartz (and beta-spodumene) network during rapid crystallization. Tetrahedral titanium exists at high temperatures in the glass network and during rapid crystallization the partition of $Ti^{+4}$ into octahedral coordination to form rutile may be incomplete.

under the trademark CORNING WARE®. The bodies are opaque, commonly white, and exhibit the cherty or waxy fracture typical of highly crystalline ceramic materials wherein the crystals have a diameter of about one micron or less. The surface quality can range from highly glossy with high $SiO_2$ and high $B_2O_3$ compositions to more dull in the case of high $Li_2O$ and high $TiO_2$ compositions.

Figure 2:
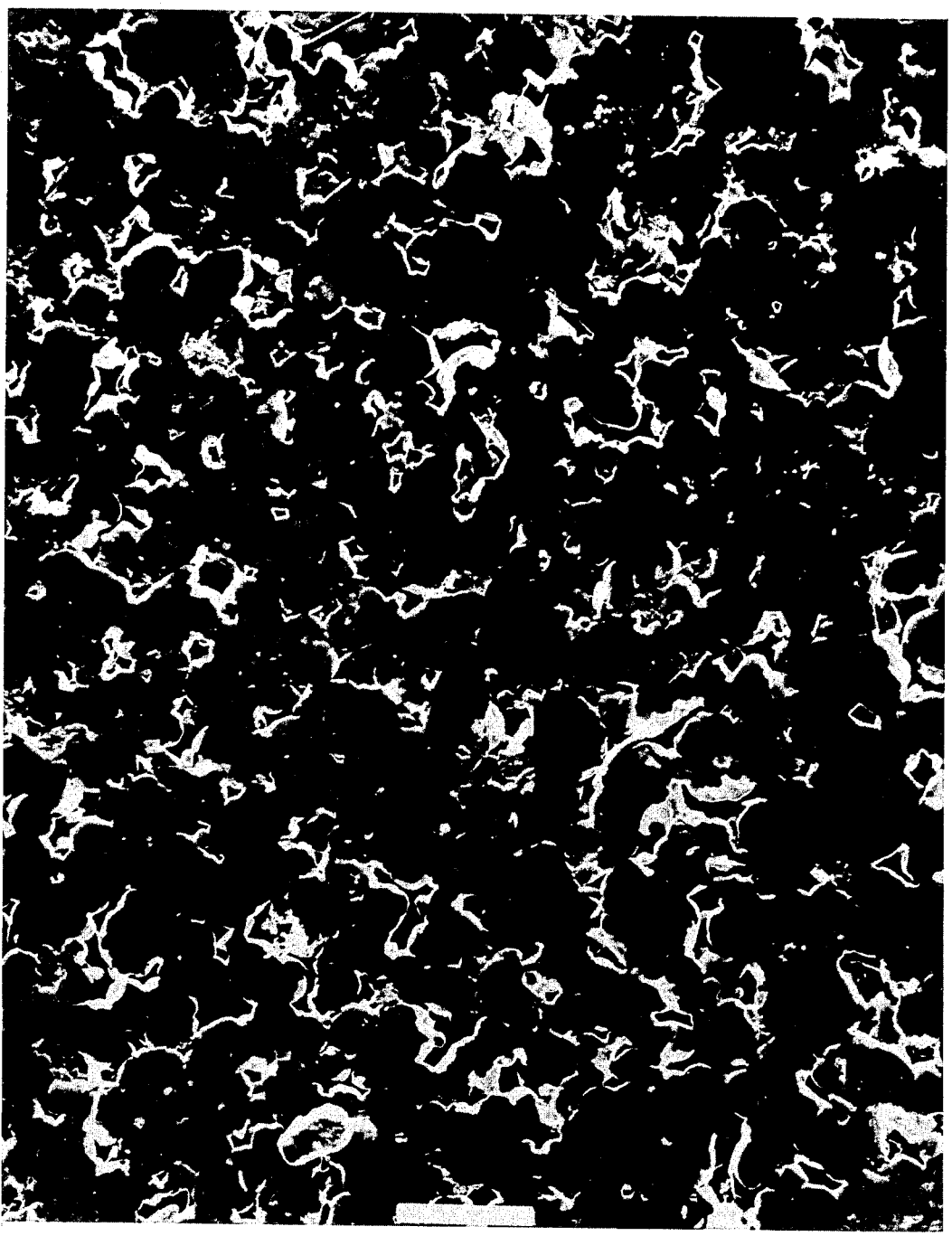

FIG. 2, a replica electron micrograph of the spontaneously-formed slab of Example 4, is representative of the characteristic microstructure of the desired highly crystalline articles. The white bar at the base of the photograph signifies a distance of one micron. The alpha-quartz s.s. crystals are seen as plate-like bodies and the rutile crystals appear as needles. The micrograph not only indicates that alpha-quartz s.s. constitutes the predominant crystal phase but also that the crystals, themselves, have diameters less than about one micron and that the total crystallinity exceeds 50% by volume.

To recapitulate, there are four general steps involved in the process of the instant invention. First, a glass-forming batch having a composition within the above-outlined operable ranges is melted. Second, the molten batch is simultaneously cooled to a temperature be-

TABLE II

| Example | Cooling Treatment | Crystal Phases | Appearance | Exp. Coef. |
|---------|-------------------|----------------|------------|------------|
| 1 | Slab allowed to cool in air to 800° C. Held at 800° C. for 15 min. Cooled to R.T. in air | Alpha-quartz s.s., Rutile | White, cherty fracture, dull surface | 42.0 |
| 2 | Slab allowed to cool in air to 800° C. Held at 800° C. for 15 min. Cooled to R.T. in air | Alpha-quartz s.s., Rutile | White, cherty fracture, dull surface | 64.0 |
| 3 | Slab allowed to cool in air to 800° C. Held at 800° C. for 15 min. Cooled to R.T. in air | Alpha-quartz s.s., Rutile | White, cherty fracture, dull surface | — |
| 4 | Slab allowed to cool in air to 800° C. Held at 800° C. for 15 min. Cooled to R.T. in air | Alpha-quartz s.s., Rutile | White, cherty fracture, glossy surface | 90.0 |
| 5 | Slab allowed to cool in air to 800° C. Held at 800° C. for 15 min. Cooled to R.T. in air | Alpha-quartz s.s., Gahnite, Rutile | White, cherty fracture, glossy surface | — |
| 6 | Slab allowed to cool in air to 800° C. Held at 800° C. for 15 min. Cooled to R.T. in air | Alpha-quartz s.s., Gahnite, Rutile | White, cherty fracture, glossy surface | — |
| 7 | Slab allowed to cool in air to 800° C. Held at 800° C. for 15 min. Cooled to R.T. in air | Alpha-quartz s.s., Beta-spodumene s.s., Gahnite, Rutile | White, cherty fracture, glossy surface | — |
| 8 | Slab allowed to cool in air to 800° C. Held at 800° C. for 15 min. Cooled to R.T. in air | Alpha-quartz s.s., Beta-spodumene s.s., Rutile | White, cherty fracture, glossy surface | — |
| 9 | Slab allowed to cool in air to 800° C. Held at 800° C. for 15 min. Cooled to R.T. in air | Alpha-quartz s.s., Beta-spodumene s.s., Gahnite, Rutile | White, cherty fracture, glossy surface | — |
| 10 | Slab allowed to cool in air to 800° C. Held at 800° C. for 15 min. Cooled to R.T. in air | Alpha-quartz s.s., Rutile | Blue-gray, cherty fracture, glossy surface | — |

The outward appearance of the products of the instant invention is very much akin to that of conventional glass-ceramic articles such as are exemplified by the commercially marketed Corning Code 9608, sold tween about 100°–300° C. above the annealing point of the glass to achieve phase separation and nucleation therein and a glass body shaped therefrom. Third, the glass body is exposed to a temperature between the annealing point of the glass and the temperature of phase separation and nucleation for a period of time sufficient to cause crystallization of the desired alpha-quartz solid solution. Fourth, the crystallized body is cooled to room temperature.

Finally, the mechanical strength of the crystallized bodies may be materially enhanced by utilizing a thermal tempering process such as is employed with glass articles. Hence, as is shown in Serial No. 559,788, supra, filed concurrently herewith by Beall, Blaszyk, and Brydges, a comparison of the mechanical strength demonstrated by annealed crystallized articles with that displayed by crystallized articles rapidly chilled from the crystallization range to room temperature can evidence a substantial improvement in strength in the latter articles. The quick quenching can be especially effective when the crystallization is undertaken at the hotter extreme of the crystallization range. Air tempering, viz., exposing the crystallized articles to a blast of cold air to chill it to room temperature, is the preferred technique due to the ease of practice and relative low cost, but immersions in various liquids such as oils and salt baths can also be operable.

The mechanism functioning to impart this improvement in mechanical strength is not fully understood but is believed to involve the small amount of residual glass which is believed to be present as a continuous phase throughout the crystallized body. This theory as to mechanism is thought to be supported in a study of FIG. 2 wherein the residual glass is seen as small depressions resulting from its greater solubility in the etchant employed to produce the replica electron micrograph.

I claim:

1. A method for making a highly crystalline glass-ceramic article consisting essentially of alpha-quartz solid solution and rutile crystals homogeneously dispersed within a glassy matrix, said crystals constituting at least 50% by volume of said article, which comprises the steps of:
    (a) melting a batch for a glass consisting essentially, by weight on the oxide basis, of about 2.5–6% $Li_2O$, 5–11% $Al_2O_3$, 1.5–7.5% $B_2O_3$, 60–75% $SiO_2$, and 6–13% $TiO_2$;
    (b) simultaneously cooling said melt at a rate between about 10°–1000° C./minute to a temperature about 900°–1050° C. to shape said melt into a glass body and secure phase separation and nucleation therein;
    (c) further cooling said shaped glass body and exposing said glass body to a temperature between about 650°–900° C., for a sufficient length of time to cause crystallization of the alpha-quartz solid solution and rutile crystals in said glass body; and then
    (d) cooling the crystallized body to room temperature.

2. A method according to claim 1 wherein said time sufficient to cause crystallization is at least about one-half minute.

3. A method according to claim 1 wherein said crystallized body is cooled to room temperature by means of a quick chilling technique to thermally temper said body.

* * * * *